United States Patent
Dressler et al.

(10) Patent No.: US 11,210,421 B1
(45) Date of Patent: Dec. 28, 2021

(54) SECURE RECORD ACCESS MANAGEMENT SYSTEMS AND METHODS FOR USING SAME

(71) Applicant: Rhinogram, LLC, Chattanooga, TN (US)

(72) Inventors: Keith Dressler, Ooltewah, TN (US); Stanley Dressler, Chattanooga, TN (US); Shannon Hastings, London, OH (US); Kathy Ford, Chattanooga, TN (US)

(73) Assignee: Rhinogram, LLC, Chattanooga, TN (US)

(*) Notice: Subject to any disclaimer, the term of this patent is extended or adjusted under 35 U.S.C. 154(b) by 0 days.

(21) Appl. No.: 17/132,914

(22) Filed: Dec. 23, 2020

(51) Int. Cl.
*G06F 21/62* (2013.01)
*G06F 21/42* (2013.01)

(52) U.S. Cl.
CPC .......... *G06F 21/6245* (2013.01); *G06F 21/42* (2013.01); *G06F 21/6272* (2013.01); *G06F 2221/2141* (2013.01); *G06F 2221/2145* (2013.01)

(58) Field of Classification Search
CPC .. G06F 21/6345; G06F 21/42; G06F 21/6246; G06F 21/6272; G06F 21/6209; G06F 21/6218; G06F 2221/2141; G06F 2221/2145; G06F 2221/2115
See application file for complete search history.

(56) References Cited

U.S. PATENT DOCUMENTS

| | | | | |
|---|---|---|---|---|
| 8,359,355 B2* | 1/2013 | O'Sullivan | ............ | H04L 51/12 709/206 |
| 8,904,551 B2* | 12/2014 | Balasubramanyan | ....... | G06F 21/604 726/27 |
| 9,338,152 B2* | 5/2016 | Etchegoyen | ............ | H04L 63/08 |
| 10,432,603 B2* | 10/2019 | Miller | ...................... | H04L 63/08 |
| 10,650,153 B2* | 5/2020 | Hussain | ................ | H04L 63/108 |
| 10,726,152 B1* | 7/2020 | Durham | ................ | H04L 63/102 |
| 2006/0229918 A1* | 10/2006 | Fotsch | .................... | G16H 10/60 705/3 |
| 2007/0078677 A1* | 4/2007 | Hofstetter | ............. | G16H 10/60 705/2 |
| 2018/0063115 A1* | 3/2018 | Miller | ................. | G06F 21/6218 |
| 2019/0087603 A1* | 3/2019 | Dror | ..................... | G16H 10/65 |

* cited by examiner

*Primary Examiner* — Linglan E Edwards
(74) *Attorney, Agent, or Firm* — Miller & Martin PLLC (57) ABSTRACT

The disclosed embodiments can be used to manage access to a plurality of secure records, thus rendering access to the secure records more efficient and secure. In accordance with certain disclosed embodiments, the secure records access management system may be configured to grant and revoke access to secure records upon the occurrence of certain events. In some disclosed embodiments, a secure record may comprise a third-party mention to indicate to the system that a third party should be granted access to the secure record. After detecting such a third-party mention, the system may grant the third party temporary access to information in the secure record, where such temporary access comprises the same access permissions as other users having access to the same secure record. The system may revoke the third party's access to the secure record.

20 Claims, 6 Drawing Sheets

SECURE RECORD ACCESS MANAGEMENT SYSTEMS AND METHODS FOR USING SAME

TECHNICAL FIELD

The present disclosure generally relates to managing access to secure records, and more particularly, to systems and methods for granting and revoking user access to secure records.

BACKGROUND

Many medical offices keep paper files containing patient medical records. These files are kept in large storerooms in the medical office with limited access and are usually a singular copy of a patient's file. Paper files may include a variety of patient documents, such as medical history forms, consent forms, lab tests, physical report cards, x-rays, and prescriptions. However, because they exist in a singular location, sharing paper files with multiple individuals involved in a patient's care is cumbersome and not timely; in addition, the medical office may not have control over copies that may have been distributed outside of the office. For example, a patient's record, or a portion of a patient's record, at a first medical office may need to be shared with one or more doctors at a different medical practice, e.g., with a different area of expertise. Copies of the patient's records from the first medical office may then be passed from the second medical practice to yet other doctors or medical practices in an uncontrolled manner. For instance, the Consolidated Clinical Document Architecture (C-CDA) provides a standardized electronic format for sharing a patient's medical history among different medical practices, where the patient's information in this standardized format can be readily forwarded from practice to practice.

Further, patients may have to call or physically go to a medical office to set up appointments or learn the results of tests, but conversations between patients and their medical office over the phone are lost, unless recorded.

Record management systems (RMS) are an attractive option for organizations looking to move from paper to electronic files because they allow creating and maintaining records in a convenient and permanent format. In the past couple years, many medical offices have opted to use RMS for storage of electronic health records (EHR). While RMS may provide convenient storage for patients' EHRs that takes up less physical space, medical practices often require collaboration on patient files. Further, many patients are opting to communicate with their health provider over email, text, and/or other more convenient channels.

Patient portal systems may provide patients, their doctors, and other health-provider staff access to convenient features, such as online appointment scheduling and prescription management. Such portal systems may include various functions and tools, including messaging features for patients to communicate directly with their healthcare provider about various issues surrounding their file. Access to these functions or the patient's entire file is often limited to the patient and personnel assigned to the patient's care; whereas it may be beneficial to share the patient's medical history with other healthcare practitioners treating the same patient.

When a patient's medical information is communicated from a first medical practice to a second medical practice, the entire patient file is not typically transferred, and doctors at the second practice may not receive a complete picture of the patient's medical history. Further, if a person at the second medical practice is looped into an existing email, text, chat, or other communication "thread" relating to the patient at the first medical practice, the person added to the communication thread still may not have access to other relevant patient information that was shared over different communication channels to which he or she was not a party. In addition, copies of different portions of the patient's records may be maintained at different medical practices, making it difficult to monitor and/or control the access and distribution of the patient's sensitive medical information.

While the problems of managing access to a patient's medical records are described above as an example, there is more generally a need for better systems and methods for managing and coordinating access to secure records. In this context, a secure record is any collection of information that is subject to at least some access restrictions, such as but not limited to secure records that may be configured to store patients' health records. The systems and methods of the present disclosure are directed to these and other features.

SUMMARY

The present disclosure provides improved systems and methods for managing access to a secure record that may be accessed by multiple parties. In some embodiments, the secure record is a patient's EHR maintained at a healthcare provider; in other disclosed embodiments, the secure record may comprise any collection of information that is subject to at least some access restrictions. The secure record may contain various types of information, such as in the example of a patient's health record, communications between the patient and a healthcare provider (e.g., including one or more emails, texts, chats, online portal messages, etc.), the patient's laboratory test results, the patient's health and personal data, the patient's appointment history, doctors' notes, and so forth, preferably organizable in chronological order. The secure record may be organized as any of a document, file, database, database entry, or any other data structure configured to store information and may comprise multiple interconnected data structures that collectively store information as a single record.

In accordance with the disclosed embodiments, a person (e.g., a "user") who has access to the secure record can provide access to that same record to another person or group of people (e.g., a "connected party"). Unlike conventional systems, when a connected party is granted access to a secure record in the disclosed embodiments, the connected party may be granted access to the entire contents of the record rather than only particular items or portions of the secure record or only a particular communication thread (e.g., email, text, chat, etc.) containing a portion of the record. Additionally, the disclosed embodiments may permit revoking the connected party's access to the secure record, for example, upon occurrence of an event or at a predetermined time. In some embodiments, the connected party's access to the secure record may be selectively discontinued, for example, by one or more people having access to the record.

In accordance with certain embodiments, a secure record management system may comprise a record gatekeeping server that manages the content of secure records and access granted thereto. The record gatekeeping server may comprise, for example, an electronic records manager that may store and organize secure records and also grant and revoke access to one or more secure records. The secure record management system may be controlled, accessed, and/or owned by any of an individual, an organization, or multiple organizations. For example, a secure management system containing a patient's secure medical records may be controlled, accessed, and/or owned by the patient (or an agent, representative, appointee, or delegate of the patient), a single medical practice having one or more healthcare practitioners overseeing the patient's care, or multiple medical practices with practitioners responsible for the patient's care.

The electronic records manager may be enabled to update and store secure records in an electronic format, for example, in a secure-records database in or accessible to the record gatekeeping server. The secure records may comprise various types of information stored using a variety of different formats. In some embodiments, the secure records may be accessible through a secure portal associated with an organization and may be viewable on a computing device accessing the secure portal over a network. Further, in some embodiments, the secure portal may comprise a graphical user interface for viewing the secure record and interacting with certain functionalities associated with the secure record, such as chat and note-taking functions.

In some embodiments, the electronic records manager may grant a third-party access to a secure record. For example, the electronic records manager, or another software module in the record gatekeeping server that may be called on by the electronic records manager, may be configured to identify connected parties mentioned in the secure record (i.e., "third-party mentions"), e.g., located at one or more predetermined locations within the secure record. A third-party mention may have been manually entered into the secure record, for example, by an administrator or other user at the record gatekeeping server, or may have been added to the secure record as a result of any other mechanisms for adding content to the secure record, such as by logging received messages, notes, or other information into the record. In some embodiments, a third-party mention may be identified based on the presence in the secure record of a predetermined indicia followed by identifying information of a third party. The predetermined indicia may comprise any one or more indicators (such as text, tags, or codes) that can be detected in a secure record. In the disclosed embodiments, for example, the indicator may comprise a predetermined symbol, such as an at sign (@), a hash (#), or an asterisk (*). The third-party identifying information following the predetermined indicia may include the third party's name, nickname, username, email address, phone number, or any other type of identifying information.

For example, if a third-party mention corresponds to a predetermined indicia of an @ sign followed by a user identifier, such as the exemplary indicia @DrJones, then the electronic records manager may detect this third-party mention in a secure record and identify it as an indication that the connected party, Dr. Jones, should be granted access to the secure record. When the electronic records manager identifies such a third-party mention in a secure record it may use this information to grant access to the secure record to the connected party (e.g., Dr. Jones). A second predetermined indicia may be used to indicate that a connected party's access to the secure record should be revoked. If, for example, the second predetermined indicia corresponds to a # symbol, the presence of #DrJones in the secure record may indicate that Dr. Jones's access to the record has been revoked, then the third-party mention of #DrJones would supersede a prior third-party mention @DrJones granting Dr. Jones access to the record. In some embodiments, the record gatekeeping server may transmit a message to the connected party for the purpose of granting or denying access to the secure record.

In certain disclosed embodiments, the electronic records manager may revoke access to a secure record previously granted to a connected party after the occurrence of an event. In some embodiments, the event may be the passage of a predetermined amount of time. In other embodiments, the event may be the receipt of an indication from a user that the third party's access to the secure record should be revoked. In other embodiments, the event may be the occurrence of a predetermined milestone associated with the secure record.

According to an exemplary embodiment, the record gatekeeping server may perform a method for managing access to a secure record. The record gatekeeping server may receive a message to be logged or otherwise added to a secure record, where the message comprises a third-party mention. The message may be, for example, a SMS, MMS, email, chat, online portal message, telephone, or any other type of message received by the record gatekeeping server. A copy of the message may be stored in at least one secure record associated with the message or, alternatively, at least a portion of the message's contents may be copied into the secure record. The message and/or its contents are preferably stored in the secure record chronologically relative to other information in the record, for example, based on a timestamp corresponding to when the message was sent or received. The received message may be viewed, commented on, or responded to by users with access to the secure record containing the copy of the received message or its contents.

In some embodiments, the third-party mention in the received message may comprise a hyperlink based on the third party's identifying information or may be used to create a hyperlink for communicating with the third party. For example, if the third-party mention is @DrJonesPractice.com in the received message, at least the "DrJonesPractice.com" portion of the third-party mention may be used to create a hyperlink to an email or other internet address for Dr. Jones. The record gatekeeping server may save a copy of the received message in the secure record.

In the disclosed embodiments, the electronic records manager may be configured to determine that the received message comprises the third-party mention, for example based on the presence of the hyperlink described above or detection of a predetermined indicia and third-party identifying information. The electronic records manager may detect the third-party mention in the received message either before or after the message is logged in the appropriate secure record(s). The electronic records manager may be further configured to determine, based on the third-party mention, the identity of the third-party seeking access to one or more secure records. Accordingly, the electronic records manager may "link" the third party (e.g., a connected party) to the secure record and instruct or otherwise coordinate with the third-party access manager to grant access to the secure record(s) to the third party.

In certain embodiments, when a third party granted access to a secure record as a result of a third-party mention in the record, the third party preferably may have the same access permissions as any other user(s) with access to the same record. For instance, the third party may be able to view all notes, messages, files, and other materials included in the secure record, and also may be permitted to add his or her own notes, messages, and information to the secure record.

BRIEF DESCRIPTION OF THE DRAWINGS

The particular features and advantages of the invention will become apparent from the following description taken in connection with the accompanying drawings in which like reference numbers indicate identical or functionally similar elements. The following figures depict details of disclosed embodiments. The invention is not limited to the precise arrangement shown in these figures, as the accompanying drawings are provided merely as examples.

DETAILED DESCRIPTION OF DISCLOSED EMBODIMENTS

Figure 1:
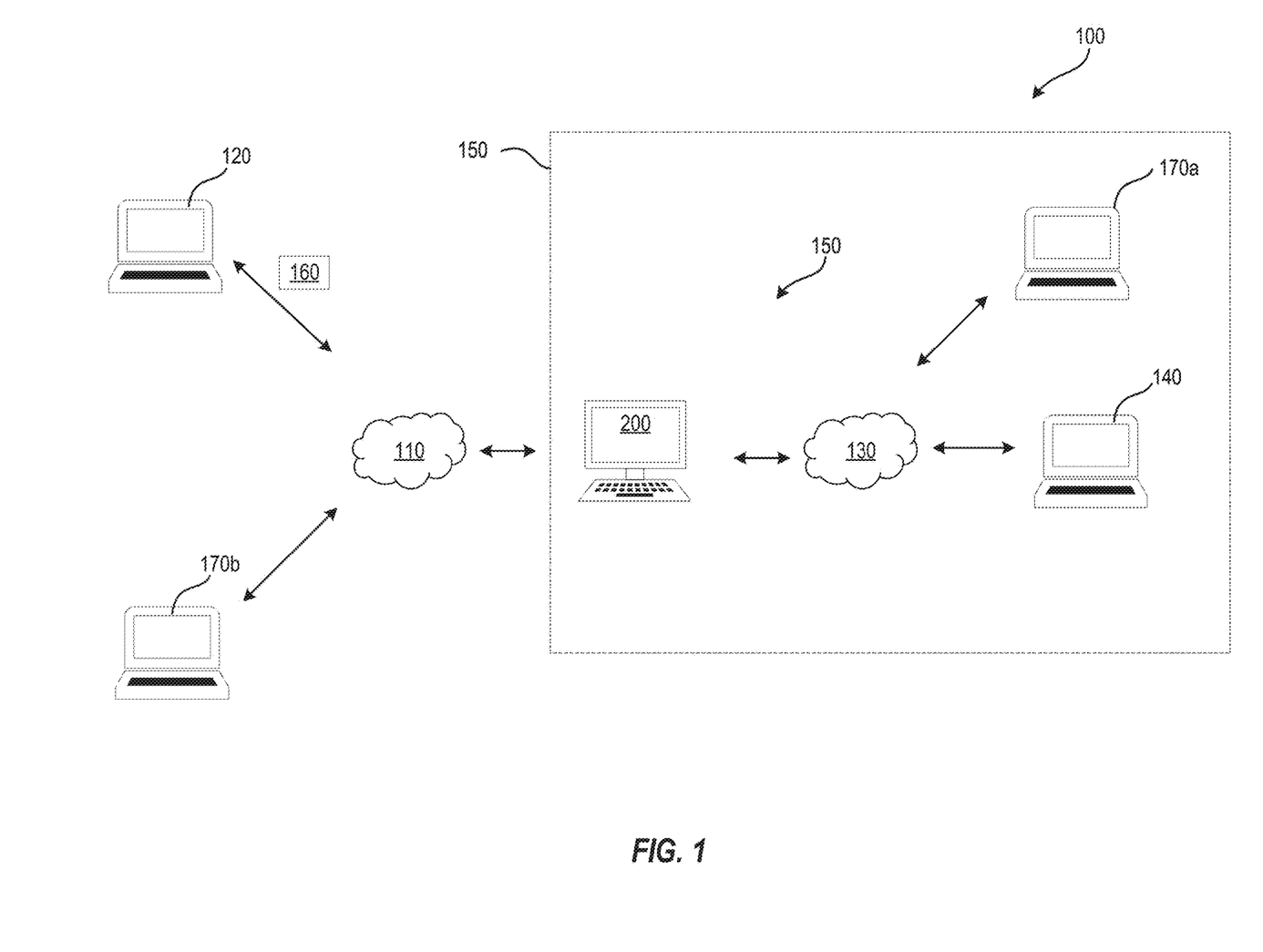
FIG. 1 is a schematic block diagram of an exemplary network comprising a record gatekeeping server, one or more remote users, and one or more internal users that may be used in accordance with certain disclosed embodiments.

FIG. 1 shows an exemplary network architecture 100 that may be used to implement the systems and methods for granting users access to a secure record in accordance with various disclosed embodiments of the present invention. In this exemplary architecture 100, one or more remote users 120 may communicate over a network 110 with a record gatekeeping server 200. Additionally, one or more internal users 140 associated with an organization 150 may communicate over a network 130 with the record gatekeeping server 200. Further, in some embodiments, one or more connected parties 170 may communicate over the network 110 and/or network 130 with record gatekeeping server 200.

Record gatekeeping server 200 may be owned, operated, and/or controlled by an organization 150 such as, but not limited to, a hospital, a doctor's office, a medical practice, a business, or another entity that may grant access to one or more secure records. In some embodiments, the record gatekeeping server 200 may be a dedicated computer or software program configured to manage access to secure records associated with the organization 150. The record gatekeeping server 200 may act as a gatekeeper for granting users access to one or more secure records that may be either stored at the record gatekeeping server 200 or that are otherwise accessible to the server 200, e.g., by accessing the secure records over network 110 and/or 130.

The networks 110 and 130 may include wired and/or wireless connections. More generally, the networks 110 and 130 may comprise any configuration of interconnected computers and/or other devices for effectuating the exchange of messages 160 between remote users 120, internal users 140, connected parties 170, and the record gatekeeping server 200. The networks 110 and 130 may comprise, for example, one or more public wide-area networks, such as the internet, and/or local area networks, such as proprietary enterprise networks, and also may include one or more telecommunication networks, such as cellular and Public Switched Telephone Networks (PSTN). The networks 110 and 130 may support packet-based and/or circuit-switched communications. Accordingly, it will be appreciated that networks 110 and 130 are not intended to be limiting and that the scope of this disclosure includes implementations in which components of the exemplary architecture 100 may be operatively linked via various communication media.

In some disclosed embodiments, the record gatekeeping server 200 may serve as an intermediary between the remote users 120, the internal users 140, and the connected parties 170. In some embodiments, the record gatekeeping server 200 may grant one or more connected parties 170 access to a secure record associated with a remote user 120 (e.g., such as a patient, customer, or other user associated with the secure record). The record gatekeeping server 200 may also revoke the access granted to the one or more connected parties 170.

The record gatekeeping server 200 may store various types of information in the secure records, including messages transmitted and received between the remote users 120, the internal users 140, and the connected parties 170. For instance, in an exemplary embodiment, the record gatekeeping server 200 may receive and store medical history documents, prescriptions, diagnostic tests and results, insurance information, consent information, messages, and notes about a patient in the patient's associated secure record, such as secure record 300 illustrated in FIG. 3. Patients, their doctors, and other connected parties may thus access the patient's entire secure record, provided they have been granted access to the record by the record gatekeeping server 200.

A connected party 170 may be one or more individuals or groups of people who have been granted access to a secure record, for example, at the request of an internal user 140 or a remote user 120. In some embodiments, the connected party 170 may require consent from a remote user 120 associated with a secure record to access that remote user's secure record. For example, the connected party 170 may be a family member of the remote user, a beneficiary, a medical provider, a governmental official, or an individual or group affiliated with another organization. U.S. application Ser. No. 17/133,454, entitled "Automated Consent Management Systems and Methods for Using Same," filed on Dec. 23, 2020, which is hereby incorporated by reference in its entirety, discloses systems and methods that may be used for obtaining consent from the connected party 170 in accordance with the disclosed embodiments. In some disclosed embodiments, moreover, the connected party 170 may be affiliated with the organization 150, such as an employee or other internal user at the organization 150, and therefore a separate consent to access a secure record may not be required for such a connected party 170 affiliated with the organization 150.

As further illustrated in FIG. 1, a remote user 120 may send and receive messages 160 to and from one or more internal users 140. Similarly, the one or more internal users 140 may send and receive messages 160 to or form one or more remote users 120. In some embodiments, as illustrated in the exemplary architecture 100 of FIG. 1, the record gatekeeping server 200 may act as an intermediary between a remote user 120 and one or more internal users 140 so that messages 160 sent between them can be stored in a secure record associated with the remote user 120, as discussed further with respect to FIG. 3. For example, an internal user 140, such as a doctor, may transmit a message intended for a remote user 120, such as a patient, about the doctor's receipt of the patient's test results. The record gatekeeping server 200 may receive the message from the doctor, store the message in a secure record associated with the patient, and transmit the message to the patient.

In other embodiments, internal users 140 may manually store correspondence(s) to and from remote users 120 in the remote user's associated secure record, for example, via a document management system or other software executing on the record gatekeeping server 200.

Each remote user 120 may communicate with the record gatekeeping server 200 using various types of devices, including but not limited to a tablet, a phone, a laptop, and a desktop computer. Further, the one or more remote users 120 may transmit messages 160 intended for one or more internal users 140 using various messaging formats, including but not limited to SMS, MMS, plain text, rich text format, and HTML. In some embodiments, the one or more remote users 120 may correspond with the one or more internal users 140 by accessing a chat or browser application accessible on the remote user's device through which the remote user exchanges messages with the server 200. For instance, in an exemplary embodiment, the application may be a chat application associated with a secure portal or communication system provided by the organization 150. Example secure portals and communication systems that may be used in the disclosed embodiments herein include those disclosed in U.S. patent application Ser. No. 15/410, 431 titled "Business to Customer Communication Portal," which is hereby incorporated by reference in its entirety.

The remote users 120 may provide messages 160 to the organization 150 containing message data that may be stored in one or more secure records by the record gatekeeping server 200. In some embodiments, the message data from the remote users 120 may comprise contact information (e.g., mailing address, phone number, and/or email address) or other personal information associated with the remote user 120. In some embodiments, the messages 160 transmitted from the remote user 120 may be associated with an IP address of the remote user's 120 device. The remote user data in a received message 160 may be stored by the record gatekeeping server 200 and used by the server 200 to determine which secure record to store the messages 160 in.

Each connected party 170 may be an individual or group of individuals that may be granted access to one or more secure records by the record gatekeeping server 200. The connected parties may include internal users 170*b* affiliated with the organization 150 or external users 170*a* that are unaffiliated with the organization. In some embodiments, the record gatekeeping server 200 may grant a connected party 170 temporary access to a secure record. For instance, in an example embodiment, a connected party 170 may be granted access to a secure record for a predetermined amount of time (e.g., a month). In other example embodiments, the connected party 170 may be granted access to the secure record until a certain result is obtained or event occurs. For instance, in the context of medical care, a doctor may wish for a patient's physical therapy team (e.g., a connected party) to be linked to the patient's record, and the physical therapy team may have access to the patient's secure record until the patient achieves a certain milestone in care.

Figure 2:
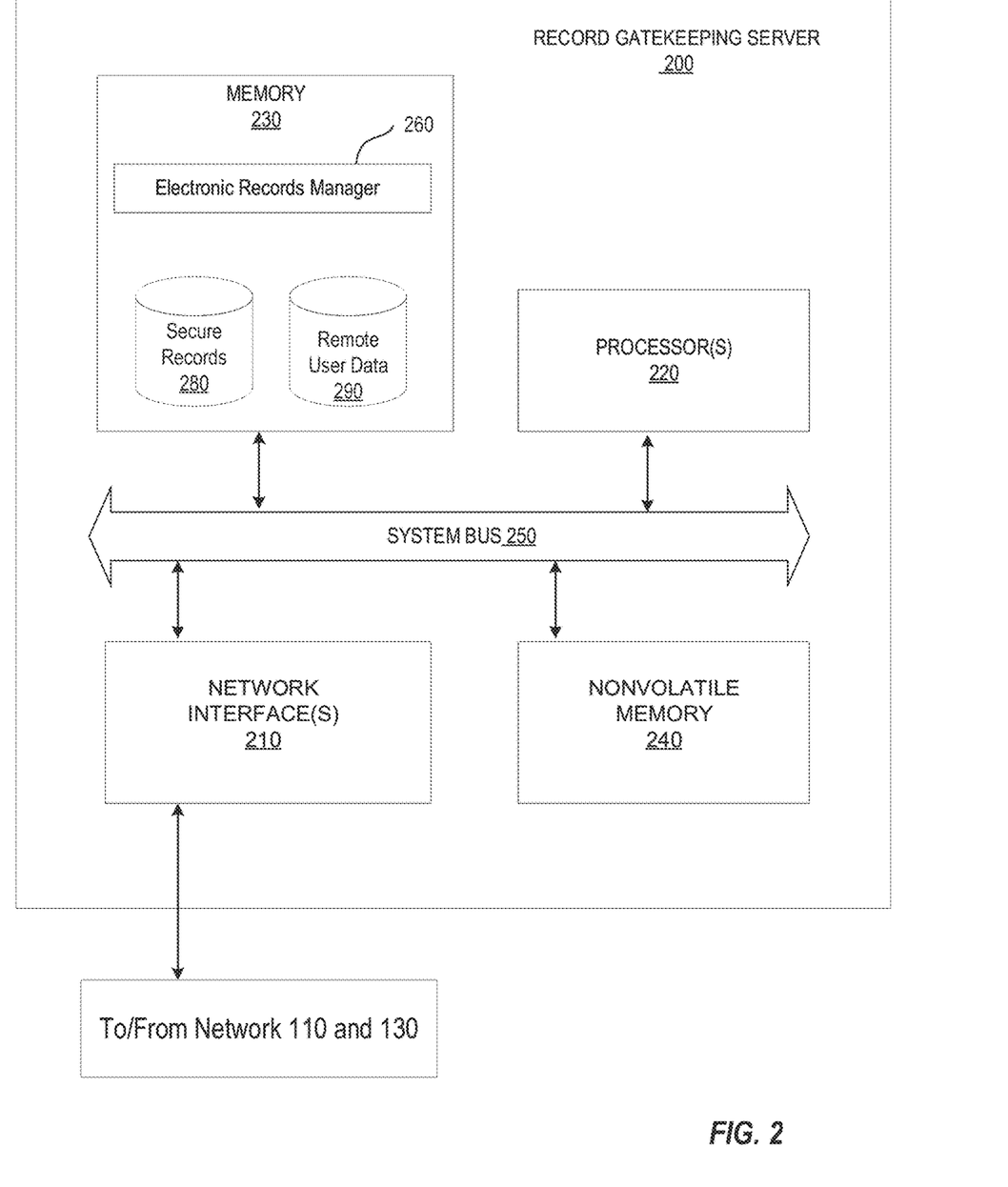
FIG. 2 is a schematic block diagram of the record gatekeeping server of FIG. 1 that may be used in accordance with certain disclosed embodiments.

FIG. 2 is a schematic block diagram of the exemplary record gatekeeping server 200 that may be used in accordance with disclosed embodiments described herein. The exemplary record gatekeeping server 200 may comprise one or more network interfaces 210 (e.g., wired, wireless, etc.), one or more processors 220, a memory 230, and a nonvolatile memory 240, interconnected by a system bus 250. The record gatekeeping server 200 also may contain other components, such as a power supply, memory controller(s), display/monitor, keyboard, mouse, printer, and so forth, which are not shown in FIG. 2 for purposes of clarity. Further, those skilled in the art will appreciate that the hardware and software components of record gatekeeping server 200 described below may be deployed in a single computer or alternatively may be distributed among multiple interconnected computers.

The network interface(s) 210 include the mechanical, electrical, and signaling circuitry for communicating data, such as but not limited to messages 160, to and from the networks 110 and 130. The network interface(s) 210 may be configured to transmit and/or receive data using a variety of different communication protocols and data formats and may include any wireless or wired/physical connections configured to communicate over different types of networks.

The one or more physical processors 220 (also interchangeably referred to herein as processor(s) 220, processor 220, or processors 220 for convenience) may be configured to provide information processing capabilities in the exemplary record gatekeeping server 200. The processor(s) 220 may comprise one or more of a microprocessor, microcontroller, central processing unit, application specific integrated circuit, field programmable gate array, or any other circuit, state machine, and/or other mechanism configured to electronically process information in accordance with the disclosed embodiments herein.

The memory 230 comprises a plurality of storage locations that are addressable by the processor(s) 220 and/or the network interfaces 210 for storing software programs and data structures associated with the embodiments described herein. The processor(s) 220 may comprise hardware elements or hardware logic adapted to execute the software programs and manipulate the data structures in the memory 230. Software programs and data may be loaded into the memory 230 from the nonvolatile storage 240, which may be a hard drive, solid state drive, battery-backed random access memory, or any other form of persistent memory as known in the art. Similarly, software and/or data that has been modified in the memory 230 may be committed to longer term storage in the nonvolatile memory 240. Each of the memory 230 and nonvolatile memory 240 may comprise one or more interconnected memories.

The processor(s) 220 may be configured to execute one or more computer readable instructions stored in the memory 230 to provide functionality of at least an electronic records manager 260 in accordance with the disclosed embodiments. The electronic records manager 260 may be used to create, modify, and store secure records, such as electronic documents, in a secure records database 280. The secure records database may, in some embodiments, be implemented as multiple interconnected (such as relational) databases and, more generally, may be any set of data structures for storing the secure records 300 accessible in the record gatekeeping server 200. Accordingly, in some embodiments, the secure records database may be distributed across one or more memories 230 and 240 and/or in other storage devices accessible over network 110 and/or 130. The electronic records manager 260 may also be used to grant internal users 140 and connected parties 170 access to one or more secure records stored in the secure record database 280.

In some embodiments, the electronic records manager 260 may access a remote user database 290 that stores select data about remote users 120. For instance, the remote user database 290 may store name and contact information (e.g., telephone number and email address) associated with remote users 120. The electronic records manager 260 may access the remote user database 290 when the record gatekeeping server 200 receives a message from a user accessing an external mode of communication. In other words, the user may transmit a message from an application that is not affiliated with the organization. In an example embodiment, a remote user 120 may text an internal user 140. In order to determine which secure record to store the communication, the electronic records manager 260 may access the remote user database 290 and determine the remote user's 120 identity based on the remote user's 120 telephone number. Once the electronic records manager 260 determines the remote user's 120 identity, the electronic records manager 260 may store the text message in the remote user's 120 secure record.

In some embodiments, the electronic records manager 260 may be implemented as two separate applications. For instance, in some embodiments, the electronic records manager 260 may comprise a record management application that organizes, stores, and updates secure records and a third-party management application that grants and revokes parties access to one or more secure records. In alternative embodiments, the electronic records manager 260 may be a single, monolithic software program.

In addition, the memory 230 may contain other computer readable instructions (not shown in FIG. 2) that when executed by the processor(s) 220 provide, for example, an operating system, network protocol stack, and other software processes, services, and applications. The memory 230 also may store various data, such as the secure records database 280 (or at least a portion thereof) and remote-user data 290 (or at least a portion thereof) that may be accessed and/or updated by the electronic records manager 260. In operation, modifications to the secure records database 280 and remote-user data 290 in the memory 230 may be committed to more persistent storage in the nonvolatile memory 240 by the processor(s) 220.

Figure 3:
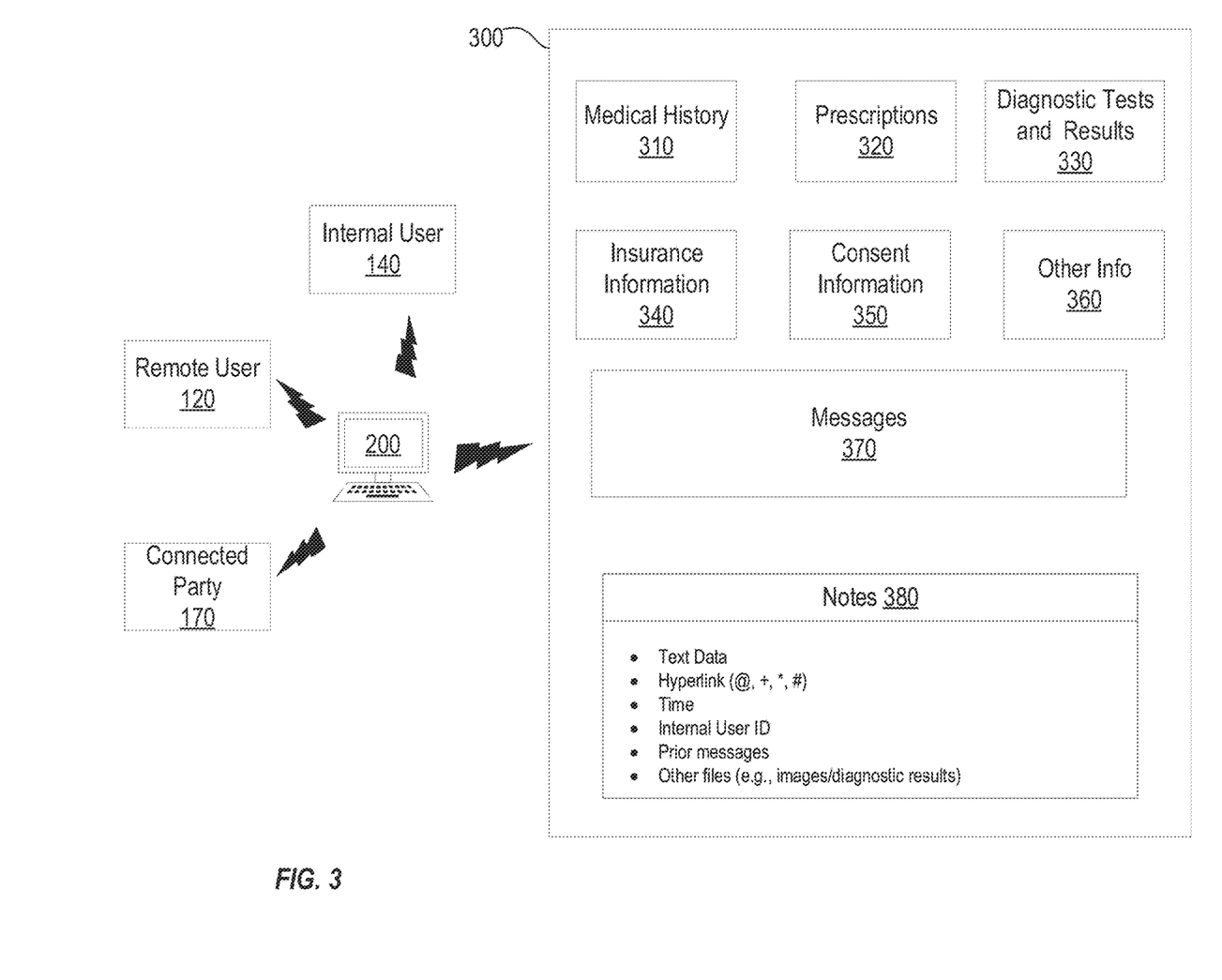
FIG. 3 is a schematic block diagram of a secure record to which remote users, internal users, and connected parties may be granted access by the record gatekeeping server of FIG. 2 in accordance with certain disclosed embodiments.

FIG. 3 shows a schematic block diagram of an exemplary secure record 300 that may be stored in the secure records database 280 in an exemplary embodiment where the secure record 300 is associated with a patient at a medical office (e.g., organization 150). The secure record 300 may be stored by the record gatekeeping server 200, such that the record gatekeeping server 200 may grant or revoke access to users, such as remote user 120 (e.g., the patient) or a connected party 170 to the patient (e.g., another doctor within the medical office, a family member, or a third-party practice). The secure record 300 may comprise various types of data associated with the patient/remote user 120 including but not limited to the patient's medical history 310, prescriptions 320, diagnostic tests and results 330, insurance information 340, consent information 350, and other information 360. Those skilled in the art will appreciate that the secure record 300 may include other information associated with a remote user 120 depending on the particular implementation.

In disclosed embodiments consistent with the above-noted example where the remote user 120 is a patient of a medical office 150, one or more messages 370 may be stored in the patient's 120 associated secure record 300. The messages 370 may comprise, for example, communications between the patient and one or more doctors, nurses, and other personnel in the medical office 150, communications between internal users 140 within the medical office concerning the patient or the patient's health, and communications between internal users at the medical office 150 and one or more of the patient's connected parties 170. In some embodiments, the messages 370 may be displayed within the secure record 300 in a predetermined format, such as the exemplary chat-application format illustrated in FIG. 6, to facilitate the display and navigation of all prior communications between the patient/remote user 120, connected parties 170, and internal users 140 within the secure record 300.

The secure record 300 may also comprise a notes section 380 that, in some embodiments, could be integrated with the messages section 370. The notes section 380 may be configured to store various types of information relating to the patient, the patient's health, communications with the patient, etc., including but not limited to information formatted as text data (e.g., doctor's notes), timestamps (e.g., appointment dates), internal user ID (e.g., patient identifier), prior messages (e.g., information obtained from messages with the patient), and other embedded files (e.g., images or diagnostic results copied into the notes section 380).

Additionally, the secure record 300 may comprise one or more third-party mentions, for example, indicating that access to the patient's secure record 300 may be shared with a connected party 170. The third-party mentions may be formatted as the combination of a predetermined indicia followed by identifying information for a connected party 170; in some embodiments, it may be further formatted as a hyperlink based on the connected party's text, email, or other network address. The hyperlink, for example, may enable an internal user 140 accessing the secure record 300 to contact a connected party 170 over the network 110 or 130. In some embodiments as disclosed in FIG. 3, the hyperlink may comprise one or more predetermined symbols (e.g., @, +, *, #) that precede identifying information of a connected party 170. In some embodiments, at least one of the electronic records manager 260 or third-party access manager 270 may be configured to determine, e.g., from information in a message 160 received from the remote user/patient 120, the particular hyperlink of the patient's connected party 170 to add to record 300.

The secure record 300 may be in any format and accessible via any user device (e.g., smartphone, desktop computer, laptop computer, tablet, etc.). In some embodiments, the secure record 300 may be accessible by the remote user 120 and/or its connected party 170 via an online communication portal and system provided by the organization 150, such as described in U.S. Patent application Ser. No. 15/410,43, entitled "Business to Customer Communication Portal," which is incorporated by reference herein in its entirety.

Figure 4:
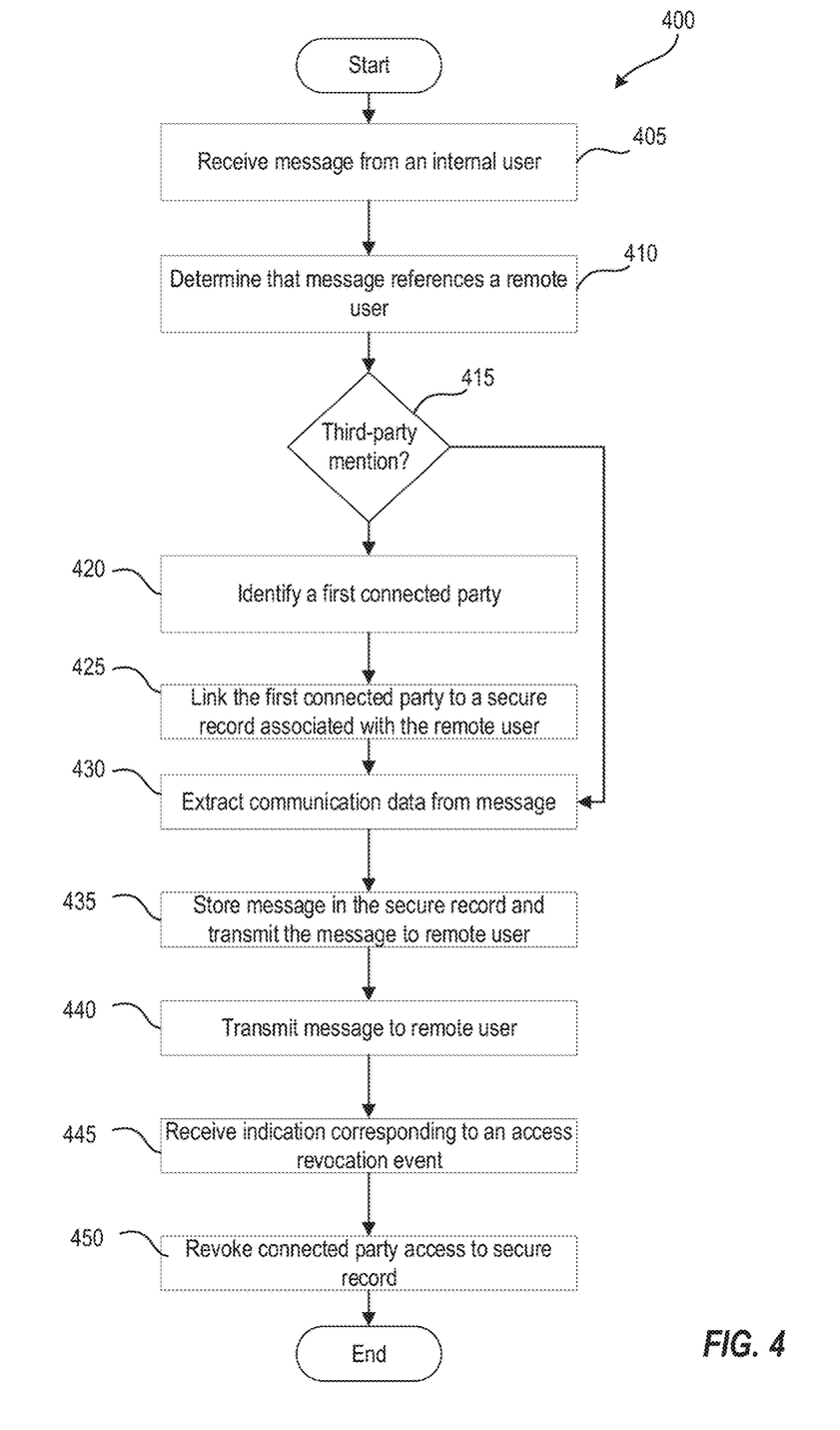
FIG. 4 is a flowchart illustrating an exemplary sequence of steps that may be performed by the record gatekeeping server of FIG. 2 to grant users access to a secure record in accordance with certain disclosed embodiments.

FIG. 4 is a flowchart illustrating an exemplary sequence of steps 400 that may be performed by the electronic records manager 260 of the record gatekeeping server 200 to grant users access to a secure record, in accordance with certain disclosed embodiments. The electronic records manager 260 may be configured to grant a connected party 170 access to a secure record, such as to provide consultation or collaboration on information contained within the secure record. For instance, a doctor (e.g., internal user 140) who already has access to a patient's (e.g., remote user 120) secure record 300 may request input from one or more of the patient's connected parties 170, which in turn may require the connected parties 170 to have access to the entirety of the patient's secure record 300, including past communications and files stored in the secure record. In some embodiments, the one or more connected parties 170 may need to upload their own files to the patient's secure record 300 or communicate directly with the patient 120.

The electronic records manager 260 may also determine when to revoke access granted to the connected party 170. Access revocation may occur when one or more events occur. For example, the events may include expiration of a predetermined period of time, revocation by an internal user 140, revocation by the remote user 120, revocation of consent by the remote user 120, or completion of one or more milestones relevant to the remote user 120.

For purposes of example and explanation, FIG. 4 illustrates a sequence of exemplary steps that the record gatekeeping server 200 may perform to grant users access to a secure record, according to certain disclosed embodiments. The exemplary steps of FIG. 4 may be supplemented or repeated to ensure access is granted to the secure record and access is revoked upon occurrence of one or more events.

The exemplary sequence starts at step 405 where the electronic records manager 260 executing on the record gatekeeping server 200 receives a message from an internal user 140 containing a third-party mention. The message may comprise, for example, remote user data, internal user data, and communication data. After receiving the message, the sequence proceeds to step 410 where the electronic records manager 260 may determine that the message references a particular remote user 120 based on remote-user data (e.g., a telephone number, email address, IP address) within the received message. By determining which remote user 120 the message is intended for, the record gatekeeping server 200 may determine which secure record to store the received message.

In some embodiments, the message may be received if the internal user 140 directly inputs the message into a patient's secure record 300. For instance, the internal user 140 may access the patient's secure record 300 through a secure portal or communication system such as that disclosed in U.S. patent application Ser. No. 15/410,431. For example, the secure portal or communication system may comprise a chat function. At step 410, the electronic records manager 260 may determine that the received message references a remote user 120.

In other embodiments, the internal user 140 may transmit the message through another communication channel, such as over the networks 110 and 130 via a text message or email message to the remote user 120. If the message is sent from the internal user 140, over the network 130 to the record gatekeeping server 200, from the server 200, over the network 110 to the remote user 120, then step 410 may occur automatically as part of the process of identifying the remote user 120 as the recipient of the message. Alternatively, at step 410, the record gatekeeping server 200 may determine the identity of the remote user 120 based on the recipient's phone number or email address contained in the received message or, in some cases, may compare information in the received message (such as a destination IP address) with remote-user data stored in a database, e.g., in the memory 230, containing identifying information relating to a plurality of remote users 120, including their names, telephone numbers, email addresses, and other information that may be used to identify different remote users.

At step 415, the electronic records manager 260 may determine whether there is a third-party mention. In some embodiments, the third-party mention may comprise any one or more indicators (such as text, tags, or codes) that can be detected in a secure record and third-party identifying information (such as a name, nickname, phone number, email address, or website). In the disclosed embodiments, for example, the indicator may comprise a predetermined symbol, such as an at sign (@), a hash (#), or an asterisk (*).

The third-party mention may be embedded in the text of the message, and in some embodiments, step 415 may comprise parsing the data in the message to determine whether a third-party mention is present. The identification of a third-party mention may trigger the electronic records manager 260 to perform step 420 where it identifies that the third-party mention references a connected party 170. Proceeding to step 425, the electronic records manager 260 may then link the connected party 170 to a secure record 300 associated with the remote user 120, as discussed in greater detail with respect to FIG. 5.

At step 430, the electronic records manager 260 may extract the communication data from the message and cause the electronic records manager 260 to store the message in the secure record and transmit the message to the remote user 120. At step 440, the electronic records manager 260 may transmit the message to the remote user 120.

At step 445, the electronic records manager 260 may receive an indication corresponding to an access revocation event. The access revocation event may be one of a variety of events that cause the electronic records manager 260 to revoke the connected party's 170 access to the secure record, as provided in step 445. For instance, the access revocation event may be the expiration of a pre-determined amount of time. In other embodiments, the access revocation event may be a message from an internal user 140 or a remote user 120 expressing a desire to revoke the connected party's 170 access. For instance, in the context of medical care, this may occur when a patient's treatment routine for an ailment is complete. In other embodiments, the access revocation step may be when upon completion of a particular milestone. For instance, in the context of medical care where a patient's oncologist's office is a connected party 170, this may occur when a patient's chemotherapy treatment is finished. Upon receiving the indication corresponding to an access revocation event, the sequence will proceed to step 450, in which the connected party's 170 access to the secure record is revoked.

Figure 5:
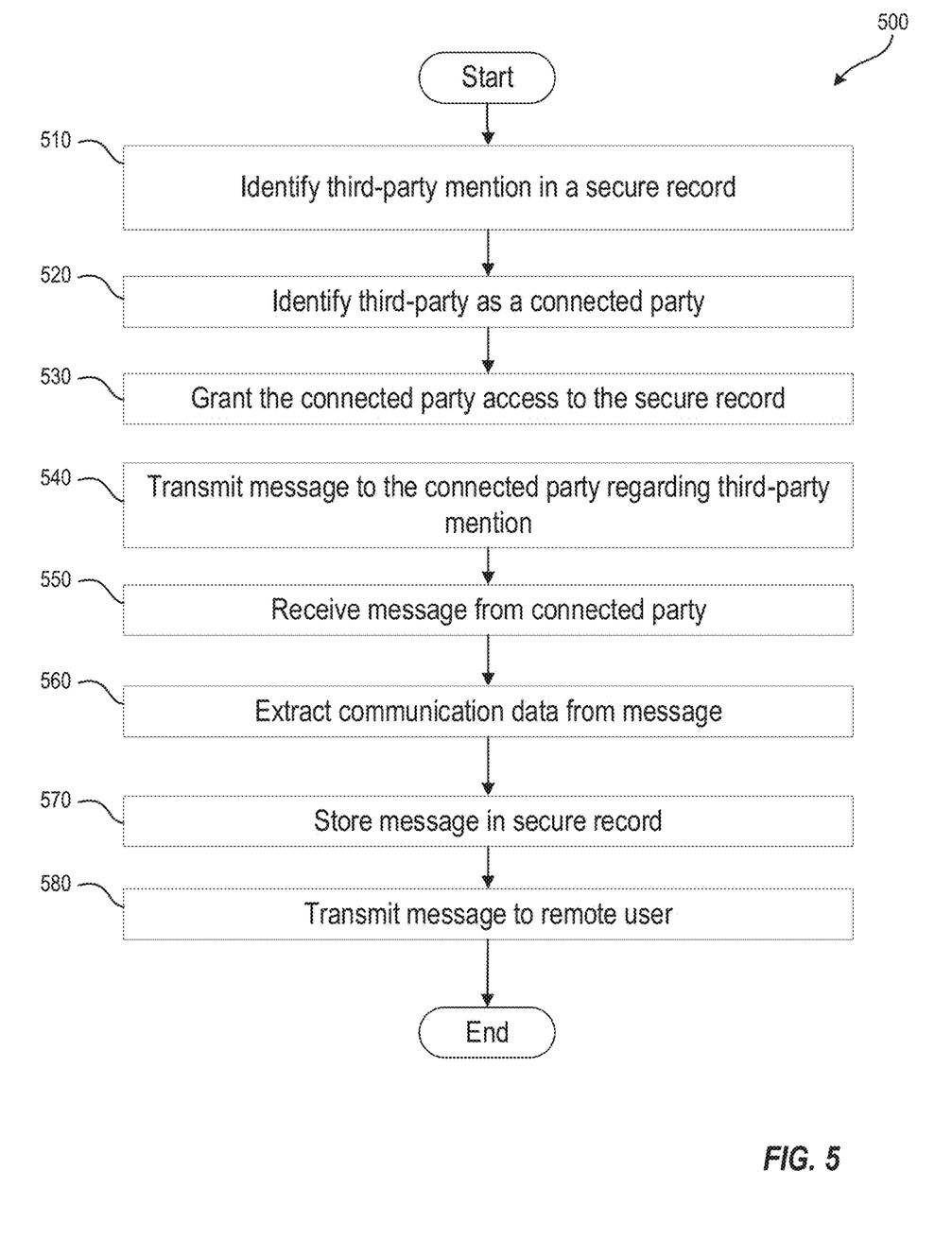
FIG. 5 is a flowchart illustrating an exemplary sequence of steps that may be performed by the record gatekeeping server of FIG. 2 to grant users access to a secure record in accordance with certain disclosed embodiments.

FIG. 5 is a flowchart illustrating an exemplary sequence of steps 500 that may be performed by the electronic records manager 260 to grant access to a secure record (e.g., secure record 300), in accordance with certain disclosed embodiments. This flowchart shows exemplary steps that may occur when a connected party 170 is granted access to a secure record.

At step 510, the record electronic records manager 260 may receive a third-party mention from an internal user 140 in a secure record associated with a remote user 120. In this example, the internal user 140 may be accessing a secure record, such as that discussed with respect to FIG. 3, and entering a message in the notes function.

At step 520, the electronic records manager 260 may identify that the third-party mention is referencing a connected party 170. For instance, where the connected party is another internal user (e.g., internal user 170b in FIG. 1) associated with the organization 150, the record gatekeeping server 200 may automatically link the internal user 170b to the secure record. In an example embodiment, the internal user 140 may then access the secure record through his own account with the secure portal. In embodiments where the connected party 170 is a third-party (e.g., connected party 170a n FIG. 1) that is unaffiliated with the organization 150, the electronic records manager 260 may identify contact information for the connected party 170a or transmit a message to the remote user 120 or the internal user 140 to provide contact information for the connected party 170a. In some embodiments, where the secure record contains confidential information, the electronic records manager 260 may determine whether there is a consent on file from the remote user 120 for the connected party 170*a* to access the secure record.

Upon determining the identity of the connected party 170, at step 530 the electronic records manager 260 can grant the connected party 170 access to the secure record. The electronic records manager 260 may then proceed to transmit a message to the connected party 170 regarding the third-party mention, as shown at step 540. This message may be sent to a preferred contact for the connected party 170. In some embodiments, the message may further comprise a link to the secure record and temporary credentials for the connected party 170 to access the secure record. In some embodiments, the message may comprise a link for the connected party 170 to make an account before accessing the secure record.

At step 550, the record gatekeeping server 200 may receive a message from the connected party, and proceed to extract communication data from the message, at step 560, and at step 580, transmit the message to the remote user 120.

Figure 6:
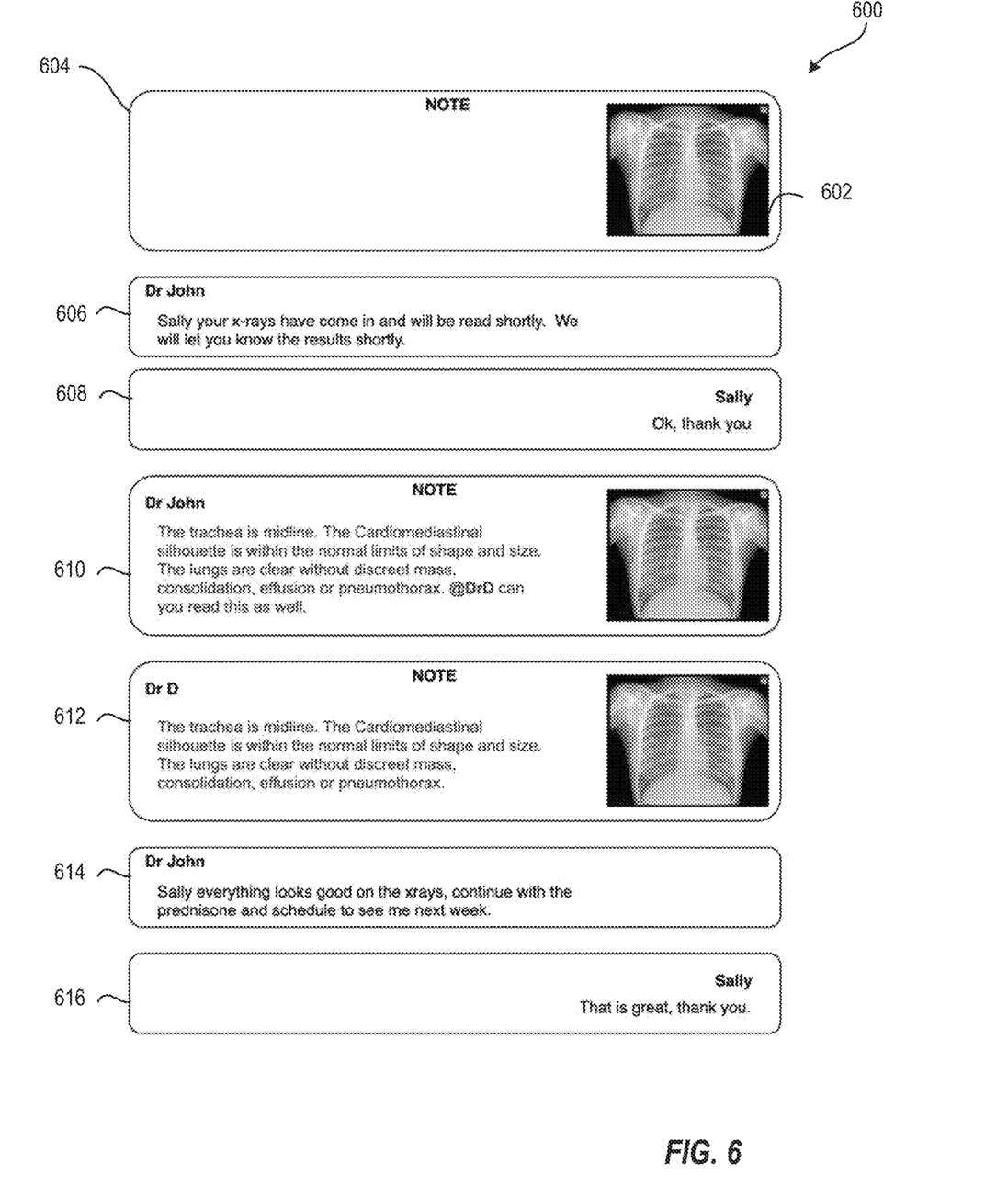
FIG. 6 is a schematic block diagram illustrating an exemplary implementation of the presently disclosed systems and methods for granting users access to a secure record.

FIG. 6 is a screen capture illustrating an example use case of the presently disclosed systems and methods for granting users access to a secure record. FIG. 6 shows an example chat and notes section 600 of a secure record associated with a patient, Sally. The electronic file is accessible by Sally's doctor, Dr. John, who is her primary care doctor and has access to Sally's secure record through his medical practice. To view Sally's file, Dr. John can enter his credentials to access a secure portal where he may view records associated with his patients, including Sally's record.

A note 604 has been added to Sally's secure record showing that her chest x-ray 602 has been received. As FIG. 6 shows, Sally's chest x-ray image may be embedded within a "Note" in her associated secure record.

Upon accessing the portal, Dr. John received a notification from the administrator 200 that a new note has been added to Sally's secure record. Dr. John may then access Sally's secure record and find a new note 604 including Sally's x-ray image 602. In this example, Sally had an x-ray image taken of her chest cavity.

Further to this example, Dr. John then transmits a message 606 to Sally through the secure portal notifying her that he has received her x-rays. Sally responds with a message 608 to Dr. John from her own device (such as her personal computer or mobile device) either directly through her patient portal or by other communication means. The message 608 may be reformatted, if necessary, for display in the secure record, e.g., accessible through a secure patient portal.

Upon reviewing Sally's x-ray image in the secure record, Dr. John decides he would like to get a second opinion to confirm his read of the x-ray image. Dr. John enters a new note 610 to Sally's secure record and includes a third-party mention to another doctor, Dr. D (@DrD). The "at" mention to Dr. D. alerts the record gatekeeping server 200 to grant Dr. D. access to Sally's record. In this case, Dr. D may be a connected party to Sally, and Sally may have previously provided consent for Dr. D to access her secure record maintained at Dr. John's medical office. After being granted access to Sally's secure record, Dr. D may view the entirety of Sally's secure record, e.g., in his portal view, including all prior messages 606 and 608 between Dr. John and Sally, including Sally's x-ray image 602. Dr. D may then enter his own note 612 in Sally's secure record. Additionally, Dr. D may receive a notification in his portal view notifying him that Dr. John has included him as a connected party in Sally's secure record. Dr. John and Sally may subsequently exchange additional messages 614 and 616 that are added to Sally's secure record. As FIG. 6 shows, all entries to Sally's secure file are preferably arranged in a chronological manner, e.g., from oldest to newest.

While the foregoing disclosed embodiments are directed to exemplary systems in which the secure record management systems and methods are controlled by an organization (e.g., a medical practice), it is also expressly contemplated that the secure records management systems and methods herein may be controlled by one or more individuals (e.g., patients) or multiple users or organizations (e.g., multiple medical practices). For example, in some disclosed embodiments, multiple users or organizations may control and access a shared set of secure records in accordance with the present invention. In such exemplary embodiments, the shared set of secure records may be implemented, for example, using blockchain or cloud-based technology, to manage the content, access, and security of the set of secure records shared among multiple users or organizations. The multiple users or organizations may coordinate, for example over one or more networks, to update at least one blockchain containing the shared set of secure records, and each organization and user may maintain its own copy of the blockchain(s). In other exemplary embodiments, the multiple users or organizations may manage the content, access, and security of the shared set of secure records using one or more cloud-based services, where the shared set of secure records may be stored by one or more servers in a cloud-based platform.

In yet other alternative embodiments, the secure records management systems and methods may be controlled by a single user (e.g., such as a patient), in which case the user may maintain the secure records and manage the content, access, and security of those secure records. For example, in such exemplary embodiments, the user may grant or deny third-party access to a set of secure records that the user stores on a personal device (e.g., a USB drive) or on another storage platform, such as a third-party storage platform or cloud-based storage platform.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions that may be executed on a computer, hardware, firmware, or a combination thereof. It also will be apparent to those skilled in the art that other processor and memory types, including various computer-readable media, may be used to store and execute program instructions pertaining to the techniques described herein. Further, the invention is not limited to any particular hardware platform or set of software capabilities.

While the disclosed embodiments illustrate various processes, it is expressly contemplated that various processes may be embodied as modules configured to operate in accordance with the techniques herein (e.g., according to the functionality of a similar process). Further, while certain processes have been shown or described separately, those skilled in the art will appreciate that the disclosed processes may be routines or modules within other processes. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for managing access to a secure record, the method being implemented on a computer system having one or more processors and at least one memory configured to store computer program instructions that, when executed by the one or more processors, configure the computer system to perform the method, the method comprising:
   storing a plurality of secure records in the at least one memory of the computer system, each of the plurality of secure records comprising information associated with a respective user;
   receiving at the computer system a message from a first user, wherein the first user is in communication with the computer system over a network, the first user has access to a first secure record associated with the first user, and such access provides the first user with a set of permissions regarding the first secure record;
   storing, in the at least one memory of the computer system, the received message in the first secure record associated with the first user;
   detecting, by the one or more processors of the computer system executing the computer program instructions, in the first secure record (i) at least one predetermined symbol, tag, or code indicating that the received message contains a third-party mention and (ii) a third-party identification information located adjacent to the at least one predetermined symbol, tag, or code;
   determining, by the one or more processors of the computer system executing the computer program instructions, that the third-party identification information corresponds to a second user; and
   in response to the second user seeking to access the first secure record associated with the first user, wherein the second user is in communication with the computer system over a network, providing the second user with the same set of permissions regarding the first secure record as the first user.

2. The method of claim 1, wherein the received message is a SMS text message, MMS message, email, chat, online portal message, or telephone message.

3. The method of claim 1, wherein the received message comprises both recipient data and sender data, wherein the method further comprises:
   accessing a database comprising user identifying information;
   identifying, based on at least one of the recipient data and the sender data in the received message and user identifying information in the database, that the received message is associated with the first user; and
   storing, in response to identifying that the received message is associated with the first user, the received message in the first secure record associated with the first user.

4. The method of claim 1, wherein the step of granting the second user the same set of permissions further comprises:
   transmitting a second message to the second user indicating that the second user has been granted access to the first secure record, the second message comprising a link to the first secure record.

5. The method of claim 1, wherein the method further comprises:
   receiving an indication corresponding to an access revocation event; and
   revoking the second user's access to the first secure record in response to the access revocation event.

6. The method of claim 5, wherein the access revocation event is selected from the group consisting of an expiration of a predetermined amount of time, receipt of a message indicating that the second user's access should be denied; and an occurrence of a milestone event associated with the first secure record.

7. The method of claim 5, wherein receiving an indication corresponding to an access revocation event further comprises:
   receiving a second message;
   storing the second message in the first secure record associated with the first user;
   detecting in the first secure record (i) at least one second predetermined symbol, tag, or code indicating that the received second message contains a third-party revocation and (ii) a second third-party identification information located adjacent to the at least one second predetermined symbol, tag, or code;
   determining that the second third-party identification information corresponds to the second user; and
   revoking the second user's set of permissions regarding the first secure record.

8. The method of claim 1, wherein the step of determining that the third-party identification information corresponds to a second user further comprises:
   identifying the second user based on the third-party identification information, and
   acquiring contact information for the second user.

9. The method of claim 1, further comprising transmitting a consent request to the first user asking the first user to approve the second user's access to the first secure record.

10. The method of claim 1, wherein the third-party mention is detected based on the presence of the at least one predetermined symbol, tag, or code.

11. A system for managing access to a secure record, the system comprising:
    one or more processors;
    one or more network interfaces configured to send messages to a plurality of users and receive messages from the plurality of users;
    at least one memory configured to store a plurality of user secure records, each of the plurality of secure records comprising information associated with a respective user, wherein the at least one memory is also configured to store one or more computer program instructions that, when executed by the one or more processors, configure the system to:
       receive from the one or more network interfaces a message from a first user, wherein the first user is in communication with the system over a network, the first user has access to a first secure record associated with the first user, and such access provides the first user with a set of permissions regarding the first secure record;
       store, in the at least one memory of the system, the received message in the first secure record associated with the first user;
       detect, by the one or more processors executing the one or more computer program instructions, in the first secure record (i) at least one predetermined symbol, tag, or code indicating that the received message contains a third-party mention and (ii) a third-party identification information located adjacent to the at least one predetermined symbol, tag, or code;

determine, by the one or more processors executing the one or more computer program instructions, that the third-party identification information corresponds to a second user; and in response to the second user seeking to access the first secure record associated with the first user, wherein the second user is in communication with the system over a network, provide the second user with the same set of permissions regarding the first secure record as the first user.

12. The system of claim 11, wherein the message from the first user is a SMS text message, MMS message, email, chat, online portal message, or telephone message.

13. The system of claim 11, wherein the received message comprises recipient data and sender data, and the one or more computer program instructions further configure the system to:

access a database comprising user identifying information;

identify, based on at least one of the recipient data and the sender data in the received message and user identifying information in the database, that the received message is associated with the first user; and store, in response to identifying that the received message is associated with the first user, the received message in the first secure record associated with the first user.

14. The system of claim 11, wherein the computer program instructions for granting the second user the same set of permissions further configures the system to:

transmit a second message to the second user indicating that the second user has been granted access to the first secure record, the second message comprising a link to the first secure record.

15. The system of claim 9, wherein the computer program instructions further configure the system to:

receive an indication corresponding to an access revocation event; and revoke the second user's access to the first secure record in response to the access revocation event.

16. The system of claim 15, wherein the access revocation event is selected from the group consisting of an expiration of a predetermined amount of time, receipt of a message indicating that the second user's access should be denied; and an occurrence of a milestone event associated with the first secure record.

17. The system of claim 11, wherein the computer program instructions for determining that the third-party identification information corresponds to a second user further configures the system to:

identify the second user based on the third-party identification information, and acquire contact information for the second user.

18. The system of claim 17, wherein the one or more computer program instructions further configure the system to transmit a consent request to the first user asking the first user to approve the second user's access to the first secure record.

19. The system of claim 11, wherein the one or more computer program instructions further configure the system to create a hyperlink based on the detected identifier.

20. A non-transitory computer-readable medium configured to store one or more computer program instructions that, when executed by one or more processors, cause a system for managing access to a secure record to:

store, in at least one memory of the system, a plurality of secure records, each of the plurality of secure records comprising information associated with a respective user;

receive at the system a message from a first user, wherein the first user is in communication with the system over a network, the first user has access to a first secure record associated with the first user, and such access provides the first user with a set of permissions regarding the first secure record;

store, in the at least one memory of the system, the received message in the first secure record associated with the first user;

detect, by the one or more processors executing the one or more computer program instructions, in the first secure record (i) at least one predetermined symbol, tag, or code indicating that the received message contains a third-party mention and (ii) a third-party identification information located adjacent to the at least one predetermined symbol, tag, or code;

determine, by the one or more processors executing the one or more computer program instructions, that the third-party identification information corresponds to a second user; and in response to the second user seeking to access the first secure record associated with the first user, wherein the second user is in communication with the system over a network, provide the second user the same set of permissions regarding the first secure record as the first user.

* * * * *